US006798986B2

(12) United States Patent
Hagiuda

(10) Patent No.: US 6,798,986 B2
(45) Date of Patent: Sep. 28, 2004

(54) SLAVE FLASH CONTROLLING DEVICE AND SLAVE FLASH DEVICE

(75) Inventor: Nobuyoshi Hagiuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 1 day.

(21) Appl. No.: 10/359,730

(22) Filed: Feb. 7, 2003

(65) Prior Publication Data

US 2003/0165335 A1 Sep. 4, 2003

(30) Foreign Application Priority Data

Feb. 15, 2002 (JP) .................................... 2002-038633

(51) Int. Cl.$^{7}$ ......................... G03B 17/00; G03B 15/03

(52) U.S. Cl. ......................... 396/56; 396/157; 396/182

(58) Field of Search ......................... 396/56, 157, 171, 396/182

(56) References Cited

U.S. PATENT DOCUMENTS 5,724,620 A * 3/1998 Hagiuda et al. ............ 396/182
6,075,947 A * 6/2000 Tokunaga .................. 396/157

FOREIGN PATENT DOCUMENTS

| | | |
|---|---|---|
| JP | A 57-88437 | 6/1982 |
| JP | B2 58-21798 | 5/1983 |
| JP | A 2000-29102 | 1/2000 |

* cited by examiner

*Primary Examiner*—Russell Adams
*Assistant Examiner*—Arthur A Smith
(74) *Attorney, Agent, or Firm*—Oliff & Berridge PLC

(57) ABSTRACT

In the present invention, slave light emissions are controlled in such a manner that a flash light amount ratio between master and slave flash lights during pre-flash is caused to be approximately equal to a flash light amount ratio between master and slave flash lights during main flash. In another aspect of the present invention, the slave light emissions are controlled in such a manner that a flash time ratio between master and slave flash lights during pre-flash is caused to be approximately equal to a flash time ratio between master and slave flash lights during main flash. Such a control over the slave light emissions realizes a flash illumination having an appropriate amount of light.

7 Claims, 5 Drawing Sheets

SLAVE FLASH CONTROLLING DEVICE AND SLAVE FLASH DEVICE

BACKGROUND OF THE INVENTION

1. Field of the Invention

The present invention relates to a slave light-emission controlling device that controls, in response to a light emitted by a master flash device, a salve light emission of an auxiliary light-emitting part.

The present invention also relates to a slave flash device having a slave light-emission controlling device built therein.

2. Description of the Related Art

An increased flash photographing method is known, in which when a flash illumination is provided in synchronization with taking a picture by a camera and amount of light of a single flash device (master flash device) is insufficient for the flash illumination, an auxiliary light-emitting part is also used to emit an additional light to compensate for the insufficiency of the amount of light.

Also known is a multiple flash photographing method in which a subject to be imaged is illuminated from a plurality of directions so as to control the shading balance of the subject.

However, many of compact digital cameras developed in recent years are equipped with no means for electrically connecting with external flash devices.

Then, in order to implement such a photographing method as described above, there have been developed a slave flash device that detects, using a sensor, a light emission of a flash device built in the camera and provides a slave light emission, and a slave light-emission controlling device (that is to be attached to a flash device for controlling a slave light emission, also called as a slave unit).

For example, Japanese Examined Patent Application Publication No. Sho 58-21798 proposes, as an increased-flash illumination approach, a method for controlling a slave flash device in such a manner that operation of the slave flash device is wirelessly associated with start and stop of a light emission of another flash device.

In the meantime, many digital cameras with built-in flash devices provide a small amount of pre-flash light emission just before making an exposure. Such a digital camera uses an imaging sensor to photometer a light reflected from a subject, calculates an appropriate amount of a main flash from the photometered amount of reflected light, and decides a flash time of the main flash. Then, the digital camera controls the flash time of the main flash based on the decided time. This method is simple and widely used because the image sensor can be utilized as a dimmer sensor. Some cameras provide a plurality of pre-flashes just before making an exposure.

However, the conventional slave flash devices and slave units consume a large part of a stored energy in response to a pre-flash of the built-in flash devices. Because of this, the remaining part of the stored energy will be insufficient at the time of an actual main flash, and thus the slave light emission cannot be used for the increased-flash illumination.

In order to solve the above problem, Japanese Unexamined Patent Application Publication No. 2000-29102 proposes a slave flash device that is not responsive to a pre-flash of the built-in flash device but only responsive to a main flash thereof to provide a slave light emission.

SUMMARY OF THE INVENTION

The method of Japanese Unexamined Patent Application Publication No. 2000-29102 described above has a problem that the slave flash device always provides a full light emission (i.e., a light emission consuming the entire energy stored) and hence cannot appropriately control the amount of light emission.

And so, an object of the present invention is to provide a slave light-emission controlling device and a slave flash device for performing a light emission in association with a pre-flash of a master flash device and obtaining a correct exposure.

The present invention will now be described below.

(1) A slave light-emission controlling device of the present invention controls, in response to a light emission of a master flash device, a slave light emission of an auxiliary light-emitting part. This slave light-emission controlling device includes a light receiving part and a flash light amount ratio controlling part.

The light receiving part receives light of the master flash device.

The flash light amount ratio controlling part controls a pre-flash light amount ratio and a main flash light amount ratio based on pre-flash and main flash lights of the master flash device received by the light receiving part so that these flash light amount ratios are caused to be approximately equal to each other, said pre-flash light amount ratio being a ratio in amount of light between the pre-flash light of the master flash device and a pre-flash light of the auxiliary light-emitting part, and said main flash light amount ratio being a ratio in amount of light between the main flash light of the master flash device and a main flash light of the auxiliary light-emitting part.

(2) Preferably, the flash light amount ratio controlling part causes stop of a light emission of the auxiliary light-emitting part to delay relative to stop of a light emission of the master flash device by a time that is approximately equal to the time by which start of the light emission of the auxiliary light-emitting part delays relative to start of the light emission of the master flash device.

(3) Preferably, the flash light amount ratio controlling part controls timing of the stop of light emission of the auxiliary light-emitting part during pre-flash, thereby adjusting total amount of flash light during the pre-flash.

(4) Preferably, the flash light amount ratio controlling part changes a discharging time of a light emission detection charge by using a charge storage part included in the light receiving part and/or a charge storage part connected in parallel with the light receiving part, and causes the pre-flash and main flash light amount ratios to be approximately equal to each other, the light emission detection charge being outputted from the light receiving part when a light emitted by the master flash device is received by the light receiving part.

(5) Another slave light-emission controlling device of the present invention controls a slave light emission of an auxiliary light-emitting part in response to a light emission of a master flash device. This slave light-emission controlling device includes a light receiving part and a flash-time ratio controlling part.

The light receiving part detects start and stop of a light emission of the master flash device.

The flash-time ratio controlling part controls a pre-flash time ratio and a main flash time ratio so that these flash time ratios are caused to be approximately equal to each other, said pre-flash time ratio being a time ratio between a pre-flash time of the master flash device and a pre-flash time of the auxiliary light-emitting part, and said main flash time ratio being a time ratio between a main flash time of the master flash device and a main flash time of the auxiliary light-emitting part.

(6) A slave flash device of the present invention includes a slave light-emission controlling device as described in the foregoing (1) and an auxiliary light-emitting part whose light emission is controlled by the slave light-emission controlling device.

(7) Another slave flash device of the present invention includes a slave light-emission controlling device as described in the foregoing (5) and an auxiliary light-emitting part whose light emission is controlled by the slave light-emission controlling device.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

An embodiment of the present invention will be described below in further detail with reference to the drawings.

Figure 1:
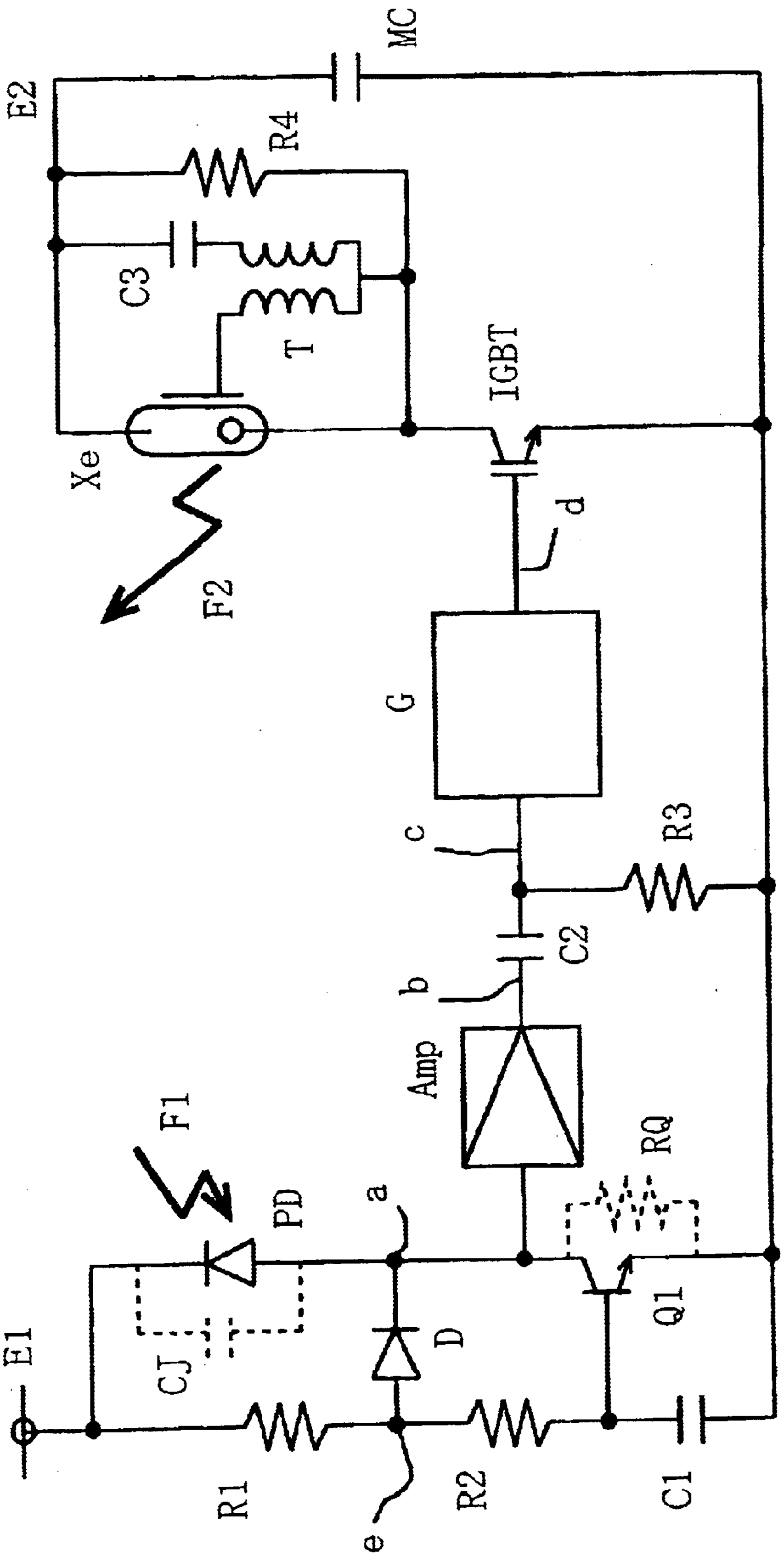
FIG. 1 is a diagram showing a slave circuit of a slave flash device.

FIG. 1 is a diagram showing the slave circuit of a slave flash device which is an embodiment of the present invention.

A photo-detector PD, which is a sensor of the slave flash device, serves as a light receiving part for detecting start and stop of a light emission of a built-in flash device.

The photo-detector PD, a capacitor C1, resistors R1 and R2, a diode D, and a transistor Q1 constitute an automatic gain control circuit (AGC circuit) of the photo-detector PD. The output of the AGC circuit is input to a voltage amplifier (Amp) located in the following stage.

A current from a power supply line E1 flows through the resistors R1 and R2 to the base of the transistor Q1, while flowing through the resistor R1 and diode D and further through the collector of the transistor Q1 to the emitter thereof. A photoelectric current produced from an ambient light by the photo-detector PD also flows through the collector of the transistor Q1 to the emitter thereof, with the result that the potential at the collector of the transistor Q1 exhibits some hundreds of milli-volts. Then, when the photo-detector PD receives a light (F1) emitted by the built-in flash device, there occurs a large current, thereby causing the potential at the collector of the transistor Q1 (at a node "a") to rise. As a result, the potential at a node "e" rises, which causes the base current of the transistor Q1 to increase via the resistor R2. At this moment, there occurs a time delay because of the capacitor C1. Because of the time delay, an abrupt variation in brightness caused by the light of the built-in flash device appears at the collector of the transistor Q1.

Figure 2:
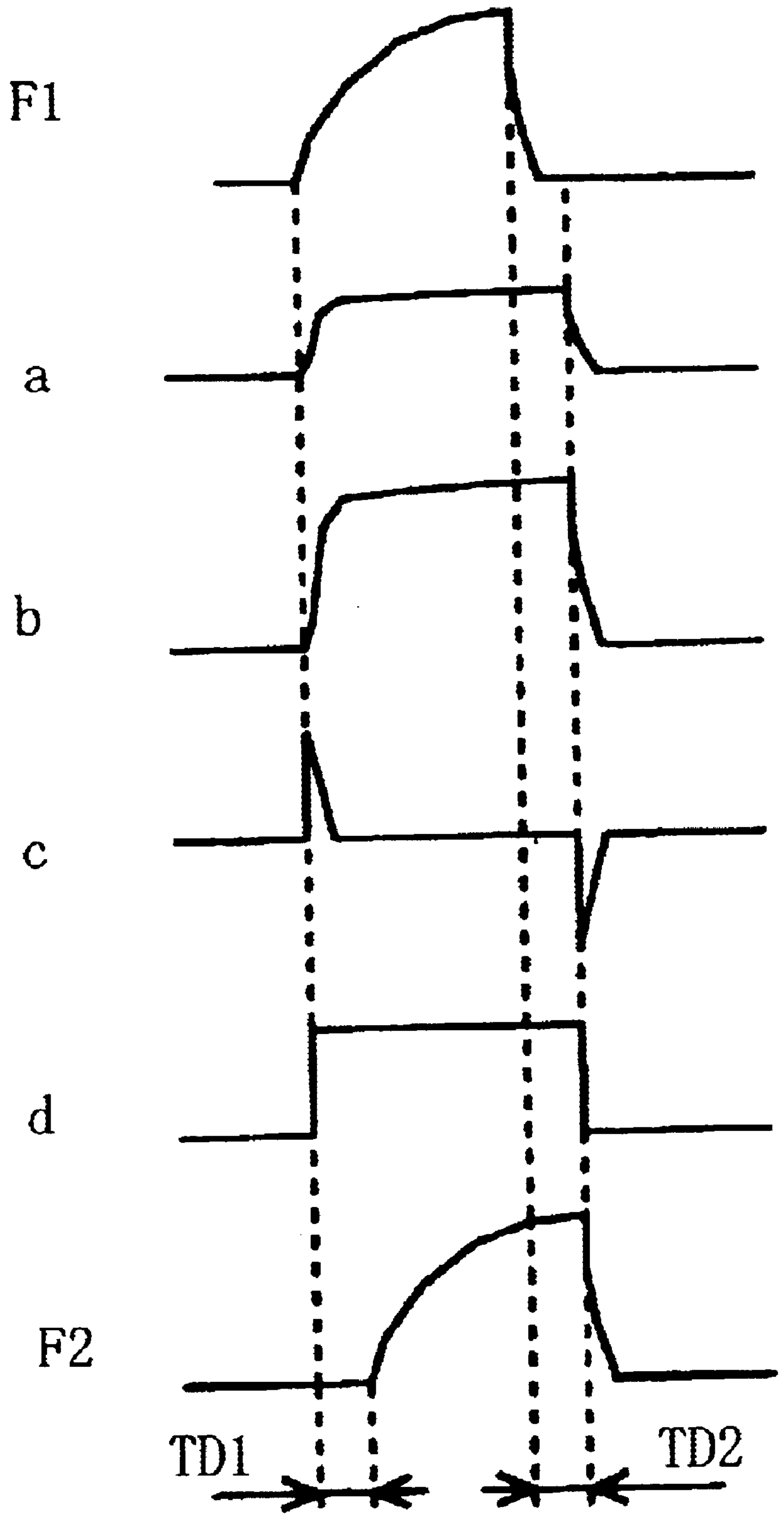
FIG. 2 is a diagram showing signal waveforms developed at the corresponding positions in the slave circuit.

When the base current of the transistor Q1 increases, the equivalent resistance between the emitter and collector thereof decreases, with the result that the potential rise at the collector of the transistor Q1 is compressed, thereby presenting a compressed voltage variation as shown by a waveform of FIG. 2(*a*).

When a slow variation as in a fixed-light situation appears, the time delay caused by the capacitor C1 provides substantially no effects, with the result that the potential at the collector of the transistor Q1 exhibits no significant voltage variation.

A main capacitor MC is charged with a flash energy of the slave flash device. The charging of this main capacitor MC is effected by a well known charging circuit (not shown).

A xenon tube Xe is a discharge tube (an auxiliary light-emitting part) filled with xenon gas. When a switching element IGBT (an insulated gate bipolar transistor) connected in series with the xenon tube Xe is rendered conductive, the main capacitor MC is discharged, thereby causing the xenon tube Xe to emit a flash light. When the switching element IGBT is rendered nonconductive during the course of the flash light emission, the light emission of the xenon tube Xe is interrupted.

The case of a stop of the light emission of the camera built-in flash device will now be described. When the light emission of the built-in flash device is stopped, the photoelectric current produced by the photo-detector PD decreases sharply. The photo-detector PD has, as a charge storage part, a junction capacitance CJ as shown by dashed lines in FIG. 1. While the junction capacitance CJ, which was charged at the reception of light of the built-in flash device, is discharged, the potential at the node "a" delays in dropping.

When the photo-detector PD receives a stronger light of the built-in flash device, the potential at the node "a" especially rises. Therefore, after the flash light emission is stopped, a time TD 2 required for the potential at the node "a" to drop is longer.

The potential at the node "a" is amplified by the following voltage amplifier Amp and converted into a waveform at a node "b" (refer to FIG. 2). Then, a differentiating circuit, constituted by a capacitor C2 and a resistor R3, develops an output "c" having a waveform as shown in FIG. 2.

Then, an IGBT gate control circuit G produces a gate signal "d" for controlling the IGBT such that a positive signal of the differentiating circuit renders the IGBT conductive and a negative signal of the differentiating circuit renders the IGBT nonconductive.

The IGBT is conductive when the gate voltage is high, while it is nonconductive when the gate voltage is low. When the potential at a position "d" becomes high, the IGBT is rendered conductive, which causes a charging current for a capacitor C3 to flow in a primary winding of a trigger transformer T. As a result, a high voltage is caused to occur across a secondary winding of the trigger transformer T, and is applied to a trigger electrode of the xenon tube Xe.

Then, the xenon tube Xe starts a light emission after a time delay TD1 as shown in FIG. 2. After the built-in flash device stops its light emission, the gate voltage becomes low after a small time delay TD2 caused by the foregoing junction capacitance CJ of the photo-detector PD, and then the IGBT is rendered nonconductive. As a result, the light emission of the xenon tube Xe of the slave flash device is stopped.

The slave flash device of the present embodiment is so arranged that the time delay TD1 of the light emission trigger is to be approximately equal to the time delay TD2 of stop of the light emission. For example, when the time delay TD2 is to be elongated in this arrangement, it may be realized by additionally providing a capacitor to the same location as the junction capacitance CJ of FIG. 1.

Next, the relationship between the amount of a pre-flash light emission of the slave flash device and the exposure by a camera will be described below.

Figure 3:
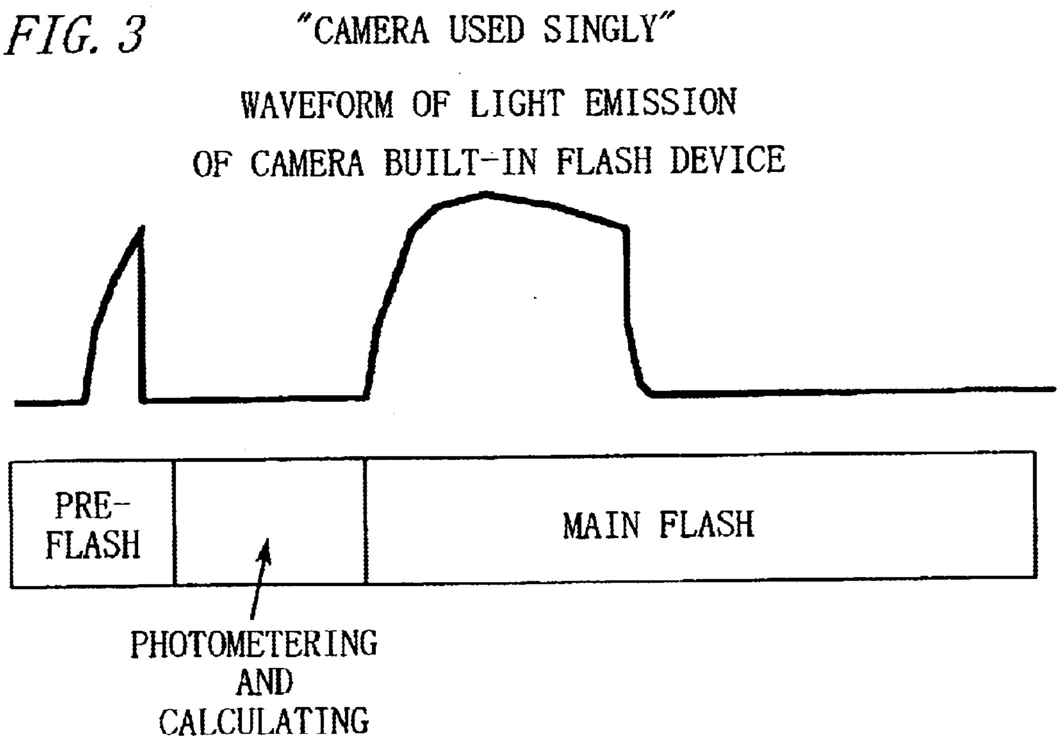
FIG. 3 is a diagram showing the state of a light emission during a flash assisted image pickup of a digital camera.

FIG. 3 is a diagram showing the state of a light emission at the time of a flash assisted image pickup of a digital camera.

The camera activates a built-in flash device to provide a predetermined amount of pre-flash light emission, and then uses an output of an image sensor (not shown) to perform a photometry. The result of the photometry is used to calculate the amount of a main flash light emission required to obtain a correct exposure. Then, the flash light emission time of the built-in flash device to obtain the calculated amount of the main flash light emission is decided from a timetable prepared beforehand. Then, the light emission based on the decided flash light emission time is provided at the time of the main flash.

Figure 4:
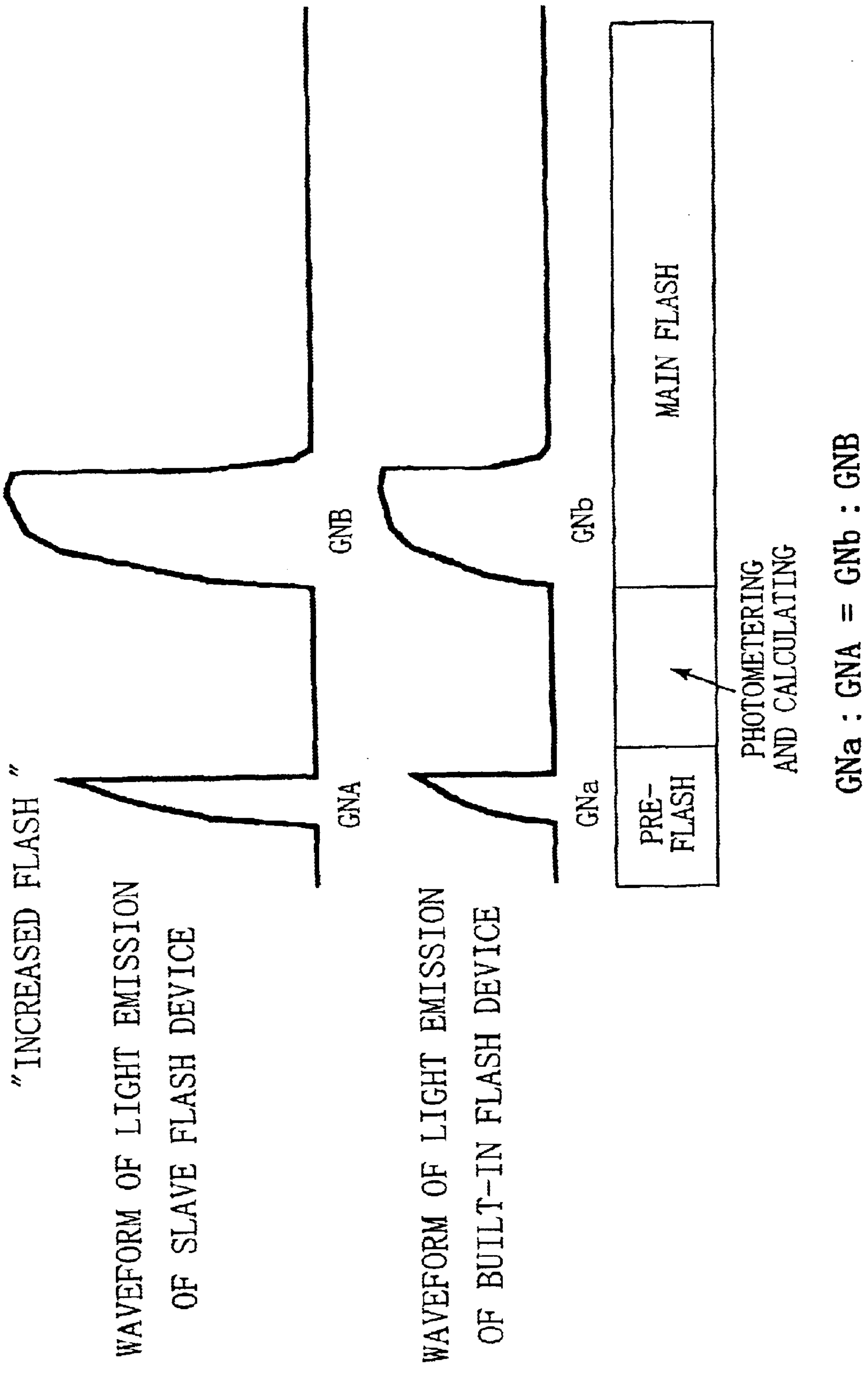
FIG. 4 is a diagram showing the state in which the slave flash device is cooperating with the digital camera.

FIG. 4 is a diagram showing the state in which the slave flash device of the present embodiment is operating together with the digital camera.

When the built-in flash device provides a pre-flash, the slave flash device synchronously emits a light. Thus, a subject to be imaged is illuminated by both of the built-in flash and slave flash devices, thereby being illuminated more brightly than in the cases where the subject is illuminated only by the pre-flash of the built-in flash device. Therefore, the photometry circuit of the camera judges that the distance to the subject is short (a misjudgment), and the flash time is controlled to be shorter so that the amount of light of the following main flash is smaller.

Since the slave flash device provides, also at the time of the main flash, a light emission in the same light amount ratio (the same flash time ratio) as at the time of the pre-flash, the subject is correctly exposed. Flash guide numbers GNa, GNb, GNA, and GNB shown in FIG. 4 have the following relationship.

$$GNa:GNA \approx GNb:GNB \qquad \text{Equation (1)}$$

That is, the light amount ratio of the pre-flash is approximately equal to that of the main flash.

The above relationship allows the image pickup to be performed by the correct exposure. This will be described below in further detail.

Figure 5:
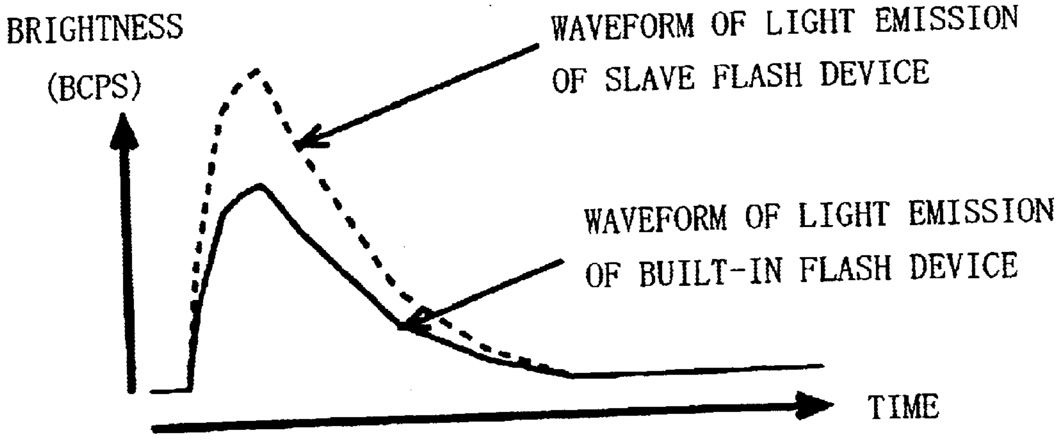
FIG. 5 is a diagram showing the light emission waveform of a built-in flash device and that of the slave flash device.

FIG. 5 is a diagram showing the light emission waveform of the built-in flash device and that of the slave flash device.

To realize the relationship shown by the foregoing equation (1), it is desirable that a ratio in brightness between the built-in flash device and the slave flash device is approximately constant at every time point. If so, only the start and stop of light emission of the slave flash device need to be synchronized with those of the built-in flash device.

However, it takes about ten microseconds (a time delay of start of light emission) for the xenon tube Xe to emit a light after triggering the light emission thereof. Therefore, even though the slave flash device triggers the light emission of the xenon tube at the time the slave flash device detects the start of light emission of the built-in flash device by the light reception sensor, the start of light emission of the xenon tube is delayed by such a time. Therefore, if the stop of light emission of the slave flash device is effected at the same time as the stop of light emission of the built-in flash device, the ratio in amount of light between the slave flash device and the built-in flash device cannot be correctly established at the time of the pre-flash, with the result that no correct exposure can be obtained at the time of the main flash.

In view of the above, the slave flash device of the present embodiment is so arranged that when the stop of light emission of the built-in flash device is detected at the time of the pre-flash, the stop of light emission of the slave flash device is delayed by approximately the same time as the time delay of the start of light emission of the xenon tube Xe of the slave flash device. In this way, the relationship of the foregoing equation (1) can be achieved.

Additionally, the above operation allows the pre-flash time ratio to be approximately equal to the main flash time ratio.

Specifically, when the built-in flash device starts a light emission and the photo-detector PD detects the light emission, the potential at the node "a" begins to rise after the time delay TD1 as shown in FIG. 2. At this moment, the AGC circuit operates in response to a photoelectric current and the conduction resistance between the collector and emitter of the transistor Q1 exhibits RQ (refer to FIG. 1). Thereafter, when the light emission of the built-in flash device is stopped, the junction capacitance CJ (the charge storage part) of the photo-detector which has been discharged by the photoelectric current is charged via the conduction resistance RQ with a time constant equal to CJ times RQ. As a result, there occurs the time delay TD2. Therefore, in a case where the time delay TD2 is to be set to a longer appropriate time, only an additional capacitor needs to be inserted in parallel with the CJ of FIG. 1.

In order to obtain a correct exposure when performing a multi-flash assisted imaging with the slave flash device of the present invention, it is desirable that the light emission profiles of the built-in and slave flash devices exhibit the same flash time and always exhibit the constant ratio in flash intensity, as described above with reference to FIG. 5. After several experiments, however, it has been known that an approximately correct exposure can be obtained by using a slave flash device whose guide number is about two times that of the built-in flash device (as to the amount of light, about four times).

In a case of a single dimmer flashing of a built-in or discrete flash device without accompanying a pre-flash, the slave flash device simultaneously starts a light emission and illuminates a subject to be imaged. Then, the camera or the discrete flash device photometers a reflected light as its own emitted flash light, and stops its light emission when the amount of light reaches a value required for obtaining the correct exposure. It is needless to say that, at this moment, the slave flash device of the present embodiment detects the stop of light emission of the built-in or discrete flash device with its sensor and stops its own light emission, thereby being able to obtain the correct exposure.

According to the present embodiment, the slave flash device provides, in synchronization with a pre-flash of the camera, a light emission of a predetermined ratio relative to the amount of light (flash time) of the built-in flash device, and provides, at the time of the main flash, a light emission of approximately the same ratio as at the time of the pre-flash. Thus, the correct exposure can be obtained by the slave flash device which provides the light emissions of approximately the same ratios relative to the pre-flash and main flash light emissions of the built-in flash device.

<Advantages of the Present Embodiment>

As described above in detail, the present embodiment has advantages as follows.

(1) Since there is provided the flash light amount ratio controlling part that causes the pre-flash and main flash light amount ratios to be approximately equal to each other, a correct exposure can be obtained regardless of the reflectivity of a subject to be imaged and distance to the subject.

(2) The stop of light emission of the auxiliary light-emitting part is made to be delayed relative to the stop of light emission of the master flash device by approximately the same time as the time by which the start of light emission of the auxiliary light-emitting part is delayed relative to the start of light emission of the master flash device. As a result, the correct exposure can be obtained.

(3) By using the charge storage part included in the light receiving part and/or the charge storage part connected in parallel with the light receiving part, the discharging time of the light emission detection charge outputted from the light receiving part when the light receiving part receives alight emitted by the master flash device can be changed. As a result, the present invention can be utilized at a low cost.

(4) Since there is provided the flash-time ratio controlling part that causes the pre-flash and main flash time ratios to be approximately equal to each other, a correct exposure can be obtained regardless of the reflectivity of a subject to be imaged and distance thereto.

<Modified Embodiments>

Modifications of the present embodiment will be described below.

In the present embodiment, the main flash (a light emission for exposure) accompanied by the single pre-flash is described as an example. The present invention, however, is not limited to this example. Since the slave flash device of the present invention can effect the start and stop of its light emission in association with the start and stop of light emission of the built-in flash device, it also can be used, for example, for an image pickup accompanied by a plurality of pre-flashes, such as a pre-flash for preventing the red-eye effect, provided prior to the image pickup.

In the foregoing present embodiment, the slave flash device was taken as an example to describe the present invention. Similar functions can be performed by connecting a slave light-emission controlling device of the present invention to a shoe contact of a TTL flash device of the type that a camera stops a light emission of the flash device connected thereto when a correct exposure is obtained. The TTL flash device is so arranged as to be input, from a hot shoe of the camera, signals of the start and stop of the light emission. Therefore, the slave light-emission controlling device of the present invention, if connected to the shoe contact of the TTL flash device, can wirelessly detect the signals of start and stop of the light emission and control the light emission of the TTL flash device.

The invention is not limited to the above embodiments and various modifications may be made without departing from the spirit and scope of the invention. Any improvement may be made in part or all of the components.

What is claimed is:

1. A slave light-emission controlling device for controlling a slave light emission of an auxiliary light-emitting part in response to a light emission of a master flash device, comprising:

a light receiving part for receiving light of said master flash device; and a flash light amount ratio controlling part for controlling a pre-flash light amount ratio and a main flash light amount ratio based on pre-flash and main flash lights of said master flash device received by said light receiving part so that the flash light amount ratios are caused to be approximately equal to each other, said pre-flash light amount ratio being a ratio in amount of light between the pre-flash light of said master flash device and a pre-flash light of said auxiliary light-emitting part, and said main flash light amount ratio being a ratio in amount of light between the main flash light of said master flash device and a main flash light of said auxiliary light-emitting part.

2. The slave light-emission controlling device according to claim 1, wherein said flash light amount ratio controlling part causes stop of a light emission of said auxiliary light-emitting part to delay relative to stop of a light emission of said master flash device by a time that is approximately equal to the time by which start of the light emission of said auxiliary light-emitting part delays relative to start of the light emission of said master flash device.

3. The slave light-emission controlling device according to claim 2, wherein said flash light amount ratio controlling part controls timing of the stop of light emission of said auxiliary light-emitting part during pre-flash, thereby adjusting total amount of flash light during said pre-flash.

4. The slave light-emission controlling device according to claim 1, wherein said flash light amount ratio controlling part changes a discharging time of a light emission detection charge by using a charge storage part included in said light receiving part and/or a charge storage part connected in parallel with said light receiving part, and causes said pre-flash and main flash light amount ratios to be approximately equal to each other, said light emission detection charge being outputted from said light receiving part when a light emitted by said master flash device is received by the light receiving part.

5. A slave light-emission controlling device for controlling a slave light emission of an auxiliary light-emitting part in response to a light emission of a master flash device, comprising:

a light receiving part for detecting start and stop of a light emission of said master flash device; and a flash-time ratio controlling part for controlling a pre-flash time ratio and a main flash time ratio so that the flash time ratios are caused to be approximately equal to each other, said pre-flash time ratio being a time ratio between a pre-flash time of said master flash device and a pre-flash time of said auxiliary light-emitting part, and said main flash time ratio being a time ratio between a main flash time of said master flash device and a main flash time of said auxiliary light-emitting part.

6. A slave flash device comprising:

a slave light-emission controlling device according to claim 1; and an auxiliary light-emitting part whose light emission is controlled by said slave light-emission controlling device.

7. A slave flash device comprising:

a slave light-emission controlling device according to claim 5; and an auxiliary light-emitting part whose light emission is controlled by said slave light-emission controlling device.

* * * * *